United States Patent
Oberdalhoff

(10) Patent No.: US 9,724,867 B2
(45) Date of Patent: Aug. 8, 2017

(54) DEVICE AND METHOD FOR GUIDING A BLOWN FILM

(71) Applicant: Windmöller & Hölscher KG, Lengerich (DE)

(72) Inventor: Tim Oberdalhoff, Lienen (DE)

(73) Assignee: Windmöller & Hölscher KG, Lengerich (DE)

( * ) Notice: Subject to any disclaimer, the term of this patent is extended or adjusted under 35 U.S.C. 154(b) by 284 days.

(21) Appl. No.: 14/394,399

(22) PCT Filed: Mar. 21, 2013

(86) PCT No.: PCT/EF2013/055875
§ 371 (c)(1),
(2) Date: Oct. 14, 2014

(87) PCT Pub. No.: WO2013/152933
PCT Pub. Date: Oct. 17, 2013

(65) Prior Publication Data
US 2015/0069671 A1 Mar. 12, 2015

(30) Foreign Application Priority Data
Apr. 11, 2012 (DE) .................. 10 2012 103 095

(51) Int. Cl.
*B29C 47/08* (2006.01)
*B29C 47/00* (2006.01)
(Continued)

(52) U.S. Cl.
CPC .......... *B29C 47/08* (2013.01); *B29C 47/0026* (2013.01); *B29C 47/0057* (2013.01);
(Continued)

(58) Field of Classification Search
None
See application file for complete search history.

(56) References Cited

U.S. PATENT DOCUMENTS

| 5,441,395 | A | 8/1995 | Planeta | |
| 2009/0304840 | A1* | 12/2009 | Frische | B29C 47/0026 425/150 |

FOREIGN PATENT DOCUMENTS

| CN | 1253875 | 5/2000 |
| CN | 1925973 | 3/2007 |

(Continued)

OTHER PUBLICATIONS

Notification of Office Action and Search Report Dated Jan. 21, 2016 From the State Intellectual Property Office of the People's Republic of China Re. Application No. 201380019450.9 and Its Translation Into English.

(Continued)

*Primary Examiner* — Monica Huson

(57) ABSTRACT

The invention relates to a guiding device for guiding a blown film between a film blowing die and a take-off roller device, comprising at least two lateral guides located opposite one another for laterally guiding the blown film, wherein at least one lateral guide is provided with a first guide segment and a second guide segment, which are connected to one another in an articulated manner. At least one lever kinematics is provided, which is in drive connection with a drive device, and which is interconnected with the two guide segments such that when the drive device is actuated by way of the lever kinematics, the angles of attack ($\alpha a$, $\alpha e$) of the two guide segments to the conveyance direction (F) of the blown film can be varied.

18 Claims, 3 Drawing Sheets

(51) Int. Cl.
*B29C 47/34* (2006.01)
*B29C 53/20* (2006.01)
*B29C 55/28* (2006.01)
*B29L 23/00* (2006.01)

(52) U.S. Cl.
CPC .......... *B29C 47/0898* (2013.01); *B29C 47/34* (2013.01); *B29C 53/20* (2013.01); *B29C 55/28* (2013.01); *B29C 47/0059* (2013.01); *B29L 2023/001* (2013.01)

(56) References Cited

FOREIGN PATENT DOCUMENTS

| | | |
|---|---|---|
| CN | 101720271 | 6/2010 |
| DE | 3430770 | 3/1986 |
| DE | 19617811 | 8/1997 |
| DE | 102005038730 | 2/2007 |
| EP | 1714770 | 10/2006 |
| EP | 1967350 | 9/2008 |
| GB | 2164896 | 4/1986 |
| WO | WO 2007/079899 | 7/2007 |
| WO | WO 2009/000509 | 12/2008 |
| WO | WO 2009/000510 | 12/2008 |
| WO | WO 2009/000511 | 12/2008 |

OTHER PUBLICATIONS

International Preliminary Report on Patentability Dated Aug. 22, 2014 From the International Preliminary Examining Authority Re. Application No. PCT/EP2013/055875 and Its Translation Into English.
International Search Report and the Written Opinion Dated Aug. 7, 2013 From the European Patent Office Re. Application No. PCT/EP2013/055875 and Its Translation of Search Report in English.
Pruefungsantrag [Examination Report] Dated Jan. 14, 2013 From the Deutsches Patent- und Markenamt [German Patent and Trademark Office] Re. Application No. 102012103095.2 and Its Translation Into English.

\* cited by examiner

DEVICE AND METHOD FOR GUIDING A BLOWN FILM

RELATED APPLICATIONS

This application is a National Phase of PCT Patent Application No. PCT/EP2013/055875 having International filing date of Mar. 21, 2013, which claims the benefit of priority of German Patent Application No. 10 2012 103 095.2 filed on Apr. 11, 2012. The contents of the above applications are all incorporated by reference as if fully set forth herein in their entirety.

FIELD AND BACKGROUND OF THE INVENTION

The present invention relates to a guidance device for guiding a blown film between a film blowing head and a take-off roller device and a method for adjusting the angles of attack of guidance segments of opposing lateral guidances of a guidance device.

Guidance devices for guiding of a blown film are basically known. For example they are characterized in WO 2009/000510 A2 and in WO 2009/000511 A2. Thereby, basically they are about manufacturing devices for blown films. For this purpose commonly blowing heads are in use which produce the blown film. Afterwards this blown film is lodged, by successively laying down both opposing sides of the blown film hose. In view of a cross section the cross section alters between mostly round to a leveled cross section by the take-off roller device based on the film blowing head. Known manufacturing devices for such blown films already use guidance devices. They are comprising for example plane guidances and lateral guidances. They are serving for providing a defined pass requirement for the blown film between the film blowing head and the take-off roller device. Particularly concerning the two opposing lateral guidances for lateral guidance of the blown film it is important, which angle is adjusted between these lateral guidances and the conveyance direction of the blown film. Particularly with segmented lateral guidances such an angle or the interaction of different angles relative to the conveyance direction are important in order to be able to provide a crease free folding of the blown film for the take-off roller device.

With known guidance devices a manual positioning for the variation of the angles is intended. In case electric gears are used, an electric actuation of the single portions of such lateral guidances is used to separately adjust each angle. This requires a huge expenditure of time and moreover a plurality of attacking positions to perform the angle adjustment. Moreover, it is not ensured, that all angles which were adjusted are matching. A non-matching angle situation for the lateral guidances can lead to the situation that a drapery causes to an increased waste of the blown film during the level process.

SUMMARY OF THE INVENTION

It is therefore the object of the present invention to at least partially solve the previously described disadvantages. Particularly it is the object of the present invention to provide a guidance device for guiding a blown film between a film blowing head and a take-off roller device as well as a corresponding method for adjusting the angles of attack of the guidance segments of opposing lateral sides of a guidance device, by which in a cost efficient and simple way the adjustment of the angles, preferably of all angles can occur, particularly in a common manner or at the same time.

The previous object is solved by a guidance device with the features of claim 1 as well as by a method with the features of claim 14. Further features and details of the invention result from the dependent claims, the description and the drawings. Thereby features and details which are described in connection with the guidance device according to the invention naturally also apply in accordance with the method according to the invention and vice versa, in a way that relating to the disclosure of the single aspects of the invention always reciprocal reference is made or can be made.

A guidance device according to the invention serves for guiding a blown film between a blown film head and a take-off roller device. The guidance device comprises at least two opposing lateral guidances for the lateral guidance of the blown film. Naturally, further guidance elements, for example level guidances can be intended. Each of these lateral guidances can comprise guiding means, for example in form of sliding elements or guiding rolls, in order to provide a guiding of the blown film in a preferably frictionless way.

A guidance device according to the invention is characterized in that at least one lateral guidance comprises a first guidance segment and a second guidance segment. The first guidance segment and the second guidance segment are jointly connected. Thereby at least one lever kinematics is intended, which is in a drive connection to the drive device. The lever kinematics is connected to the guidance segments in a way that during the drive of the drive device the angles of attack of both guidance segments are variable towards the conveyance direction of the blown film via the lever kinematics.

With the guidance device according to the invention at least one of the opposing lateral guidances is equipped in a manner according to the invention. Naturally, it can be advantageously, if both opposing lateral guidances are formed in the subsequently described manner according to the invention. By providing more than two opposing lateral guidances a formation according to the invention for a plurality or for all lateral guidances is advantageously.

The jointly connection of those guidance segments can be provided by for example joint means or hinges. Thereby so called piano hinges, integral hinges or real joint hinges can be applied. The single guidance segments are for example frame components, which provide a fitting for guidance rolls or guidance slide elements. The guidance segments can comprise preferably a plane or mostly plane extension concerning their guidance property. Thereby an angle of attack of each particular guidance segment towards the conveyance direction of the blown film can be defined in a definitely manner. Therefore, for each lateral guidance which is formed in a manner according to the invention at least two angles are adjustable relative to the conveyance direction of the blown film. For the guidance segment which is as the first guidance segment located closer to the film blowing head and therefore being contacted by the blown film at first this angle of attack can also be described as a feeding angle. The corresponding angle of the second guidance segment which subsequently is in contact with the blown film can be described as gradient angle between the second guidance segment and the conveyance direction of the blown film.

For the guidance device according to the invention a lever kinematics is intended, which is in drive connection particularly with one single common drive device. The drive device can be formed in diverse manners and comprises for instance a gear, a guidance rail and/or a crank rail and/or a gear device. Naturally, the drive device can be performed manually as well as automatically. Preferably a particularly cost efficient embodiment is chosen, so that for example a linear drive particularly an electrically motor driven linear drive is applied. The lever kinematics itself comprises a plurality at least two levers. Therefore it is ensured, that the motion provided by the single drive devices of this drive device is transferred to both guidance devices for the variation of the angles of attack via the lever kinematics.

In contrast to the known guidance devices according to the state of the art the common angle of both guidance devices of the drive device according to the invention can be adjusted via the lever kinematics.

Particularly a common adjustment of both angles of attack occurs, so that by the formation of the lever kinematics or the drive device the correlation of both angles of attack towards one another is automatically predetermined. Further also a dependence concerning the cross section of the blown film or the distance of the two opposing lateral guidances towards another can be intended for the variation of the angles of attack. Therefore, it is guaranteed, that false adjustments of the angles of attack or an improper correlation of the single angles of attack for both guidance segments about each other is avoided.

Further by the common adjustment of the angles of attack a particularly fast and therefore cost efficient variation of the angles of attack occurs. Thereby it is possible that by an alteration of the cross section of the blown film, for example by a product change and by an alteration of the film blowing head, a particularly short set up time for the alteration of the guidance device is possible regarding the required modified angles of attack.

By providing two different guidance devices for at least one lateral guidance an angle between these two guidance devices results automatically. The alteration of the first guidance segment thereby generates an angle with a second guidance segment. By defining both angles of attack of both guidance segments towards the conveyance direction of the blown film this further angle between both guidance segments automatically results, which is also marked as an articulation angle. This leads to a decrease of the distance of both opposing lateral guidances particularly via the first guidance segment. Subsequent to the articulation between both guidance segments a divergence of both second opposing guidance segments occurs so that a broadening of the distance of both opposing lateral guidances occurs. This articulation execution of both lateral guidances leads to a constant keeping of the distance between the film blowing head and the take-off roller device in spite of the alteration of the cross section of the blown film. This adjustment concerning the distance leads to a reduction of the probability of a drapery of this distance for the blown film. Therefore the quality of the leveled blown film is increased or the waste during the process is reduced.

The drive device comprises preferably one or more rail/rails in which part of the lever kinematics or part of the drive device are guided. This rail or these rails can also be formed as guide crank(s) or rail crank(s) or guide rail(s).

The guidance device according to the invention can be further developed in a way that the drive device comprises at least one slide, which is translatory movably mounted alongside a rail. This slide is connected to the lever kinematics at least at one position, particularly at two positions. This connection represents a drive connection of the lever kinematics with the drive device. The part of the drive device which is formed as a slide, can also be translatory shifted guided by a rail of a defined trajectory. This trajectory preferably performs a straight line. If this slide is moved and therefore the lever kinematics is correspondingly moved via the drive device, a transmission of this movement results via the lever kinematics to both drive segments. In this manner, a distribution of the single movements of the slide to two movements is achieved via the lever kinematics particularly as movement deflector, namely for the adjustment of the first guidance segment and the second guidance segment in a common manner. The drive connection between the lever kinematics and the slide is particularly formed as a rotational mounting via a pin mounting. The rail and the slide are particularly part of the drive device in accordance with the present invention. Preferably a direct drive of the slide is intended for example in an electromotive manner, particularly as a linear drive. Such linear drive is particularly cost efficient and can be equipped with lots of additional functionalities, particularly a detailed position determination or a simple end switch device. The slide can be moved in the rail, for example via ball bearings, rolls or in a gliding manner.

A guidance device according to the present invention can be further developed in a way that at least one guidance rail is intended in which at least one guidance lever of the lever kinematics is translatory mounted. The translatory movably mounting of the lever kinematics particularly the guidance lever can also occur via a rotation bearing in form of a pin or a roll bearing assembly. Therefore a guidance lever can be moved alongside this guidance rail also mainly alongside a straight line. By this movement the guidance lever generates an influence on the lever kinematics so that the transmission of the movement of the guidance lever via the lever kinematics to the corresponding guidance segment can be achieved. The adjustment of the guidance rail serves for a rotation or a lever movement of the lever respectively so that particularly a control of the lever kinematics and therefore a control of the variation of the angles of attack of the guidance segments are formed by the guidance rail. Particularly by the adjustment of the guidance rail concerning the distinct angularity to the conveyance direction of the blown film can by this manner adjust the strength or the manner of variation of the angles of attack of the guidance segments. The guidance lever regulates particularly the movement of the lever kinematics and pretends in that way the adjustment of the angles of attack of all or at least a part of the guidance segments. Therefore this guidance rail can also be formed as a guidance crank, which enables the adjustment of the variation of the angles of attack by its assembly. By an alteration of the angles of attack of the guidance rail another characteristic for the guidance device according to the invention can be pretended. Therefore the assembly and the adjustment of the guidance rail particularly serves as a basic adjustment of the guidance device according to the invention, so that the desired characteristic of variation for the variation of the angles of attack of the guidance device is pretended by the angle variation during the adjustment of the guidance rail.

The guidance rail according to the invention can be further developed in a way that the guidance rail with a conveyor of the blown film forms an angle smaller than 90°, particularly smaller than approximately 88°. The guidance rail has an angle towards the conveyance direction which is not a perpendicular line. Thereby an acute-angled adjustment of the guidance rail towards the conveyance direction of the blown film occurs. By this embodiment a particularly simple variation of the angles of attack is possible since in this way a tilting of the lever kinematics and therefore the desired lever movement for the variation of the angles of attack can be provided.

Preferably such a guidance rail proceeds alongside of a straight line which proceeds not in a parallel way and therefore also not acute-angled towards the rail of the drive device, in which a slide is translatory movably mounted. By the selection of the angle of the guidance rail relative to the conveyance direction of the blown film particularly the form of the basic adjustment the variation characteristics for the angles of attack of a guidance device according to the invention can be pretended.

It is likewise advantageously when at least a first guidance rail and at least a second guidance rail are intended by the guidance device according to the invention. Thereby in at least the first guidance rail a first guidance lever of a lever kinematics and in at least a second guidance rail a second guidance lever of a lever kinematics is translatory movably mounted. Is such a lever kinematics built with several parts the at least one first guidance lever for the variation of the first guidance segment of the lateral guidance and the at least second guidance lever for the variation of the angle of attack of the second guidance segment of the lateral guidance are available. With other words, for each angle of each guidance segment preferably a distinct guidance lever with a distinct guidance rail is intended. Thereby a separate adjustment presetting of each angle can be pretended by the corresponding correlation between the guidance lever and the corresponding guidance rail. Particularly a distinct variation characteristic can be pretended for each angle so that during the operation of a drive device according to the invention by the drive of the drive device automatically a tracking of the variation of all angles of attack is available in a common manner concerning the distinct variation characteristic. The adjustment of all angles of attack occurs therefore collectively and coordinated by the common drive device.

It is also an advantage when with the guidance device according to the invention for the connection with a first guidance segment the lever kinematics comprises a first section lever and for the connection with a second guidance segment comprises a second section lever. The guidance levers illustrated in the preceding paragraphs serve for the production of a drive connection between the lever kinematics and the drive device as well as for the defined gathering of the angles of the desired variation. At the other end of the lever kinematics both section levers serve for the connection of the lever kinematics to the respective guidance segment. Therefore, they serve for the transfer of the movement of the lever kinematics at the respective lateral guidance segment so that at present the transfer of the movement originally commonly provided by the drive device occurs. Both section levers can be in a lever effective contact with the corresponding guidance levers, the first section layer with the first guidance lever and the second section layer with the second guidance lever.

Another advantage is when the lever kinematics of a guidance device according to the invention comprises at least a first kinematics part, which is connected to the first guidance segment particularly via the first section lever. Further, at least a second kinematics portion is intended, which is connected to the second guidance segment particularly via the second section lever. In other words, the first kinematics part can comprise the first section lever and the first guidance lever or the second kinematics part can comprise the second section lever and the second guidance lever. Both kinematics parts are not necessarily mechanically coupled to one another, but they can rather be independent from each other. The common movement of this lever kinematics in two parts can for example be performed via the connection of both kinematics parts to the drive device in a drive connective way. For example both kinematic parts of the lever kinematics can be mounted apart from one another at the same slide of a drive device.

Another advantage of the guidance device according to the invention can be achieved by a drive connection of at least one of the two kinematics parts, particularly via the first guidance lever and/or a second guidance lever with the drive device, particularly the slide. Therefore at this part of the drive device, at the slide, a distribution of the movement of the slide or the drive device of both kinematics parts occurs respectively so that from one movement of the slide a duplicated movement of the lever kinematics and therefore results in a common movement of both guidance segments of the corresponding lateral guidances.

It is a further advantage that when in a guidance device according to the present invention the drive device comprises at least one circular chain device via which the drive device is in drive connection with at least one further lever kinematics. This chain device can for example be a circular belt or a circular chain which realizes a transfer of a movement of the drive device for example in form of a slide with a circular role. Thereby a reversal of the movement direction can occur so that a drive device drives the first slide for the first lateral guidance, while for the opposing lateral guidance a corresponding second slide with opposing connection and therefore with opposing movement direction of the same drive device is actuated. Preferably not only one but two or more of such chain devices are intended so that a symmetrical actuation or a symmetrical stabilization can be intended within one scope for all the guidance segments. This leads to the fact that with two lateral guidances with each two guidance segments a single drive device with a single electrical gear can be intended while altogether four rails for the translatory movably mounting of four slides, two chain devices for the transfer of the movement of the electrical gear as well as four guidance rails for the corresponding four guidance levers for all four guidance segments are intended.

Another advantage can be achieved, when the chain device by a guidance device according to the invention is connected with at least one slide via at least one bracket, which is translatory movably mounted alongside a rail, and with which the lever kinematics is in drive connection at least one position, particularly at two positions. This concerns preferably one or more slides, wherein a power transmission between the slides can occur via the bracket and the chain device. By the punctual choice of the connection via the bracket the movement direction can be chosen so that an opposing movement direction with opposing lateral guidances is possible with one single drive or one single drive device.

Another advantage is achieved in a way, that at least one frame is intended by the guidance device according in the invention, in which the drive device and/or the lever kinematics and/or the lateral guidance is mounted. Affiliated with this are particularly rails and/or guidance rails or slides which run in rails. The frame serves for the mechanic stability or the possibility of linkage or the mounting of the guidance device according to the invention during the assembly device for the blown film respectively. Therefore that in a single frame preferably most or all mechanically effective parts of the guidance device are assembled, further frame parts particularly at the opposing edge of the guidance device can be resigned. The frame serves particularly also for stabilization of an electromotive drive of the drive device.

According to the invention it can be an advantage when the drive device of the guidance device according to the invention comprises at least one electric motor, particularly in form of a linear drive. The use of an electric motor allows a particularly cost efficient and simple automation of the variation of the angles of attack. The use of a linear drive further leads to cost efficient additional features like for example the allowance of an end switch or a particularly accurate positioning of the slide powered by this linear drive respectively.

Another advantage is achieved by an identical formation of both lateral guidances of the guidance device according to the invention and both comprise a lever kinematics, which is in drive connection with the same drive device. This leads to pretending a mainly symmetrical embodiment according to the invention so that with one and the same drive device particularly with a single electric drive, the variation of all angles of attack of all four guidance segments of both lateral guidances can be operated.

Another embodiment of the present invention is a method for adjusting the angles of attack of guidance segments of opposing lateral guidances of a guidance device. Such a method is characterized in that by the drive of a drive device via a drive connection with at least a lever kinematics the angles of attack of at least two guidance segments can vary in conjunction, particularly at the same time. Such a method can preferably be developed in a way that the guidance device is established according to the invention. This implicates the same advantages like they are described in detail in reference to the guidance device according to the invention.

BRIEF DESCRIPTION OF THE DRAWINGS

The present invention is described in detail by means of the enclosed figures. The used phrases "left", "right", "top" and "bottom" are related to the orientation of the figures with normally readable references. It is shown schematically.

DESCRIPTION OF SPECIFIC EMBODIMENTS OF THE INVENTION

Figure 1:
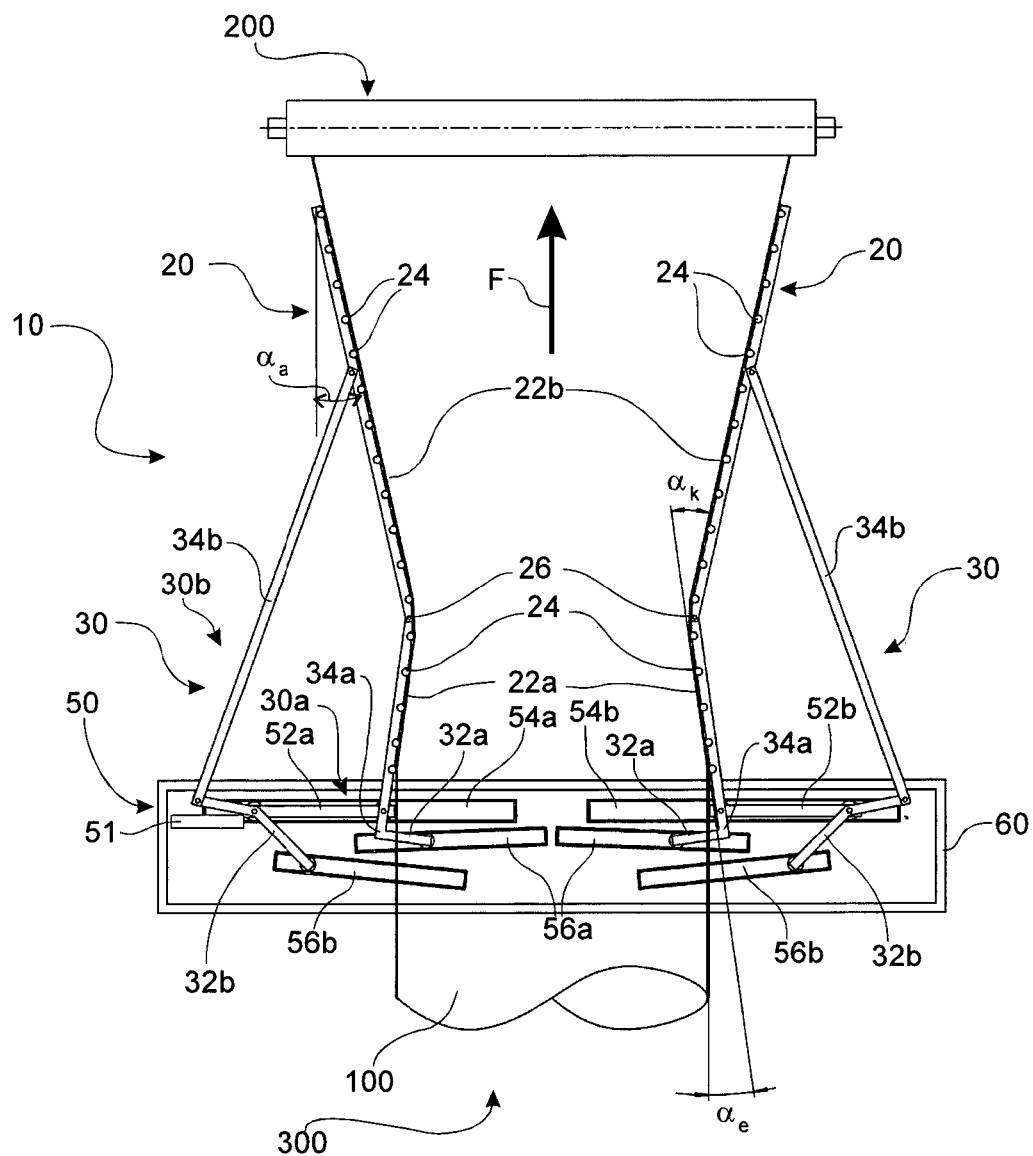
FIG. 1 a first embodiment of the guidance device according to the invention with a maximal working width, FIG. 2 another embodiment of a guidance device according to the invention with a medium working width, and FIG. 3 an embodiment of a guidance device according to the present invention with a minimum working width.
Figure 2:
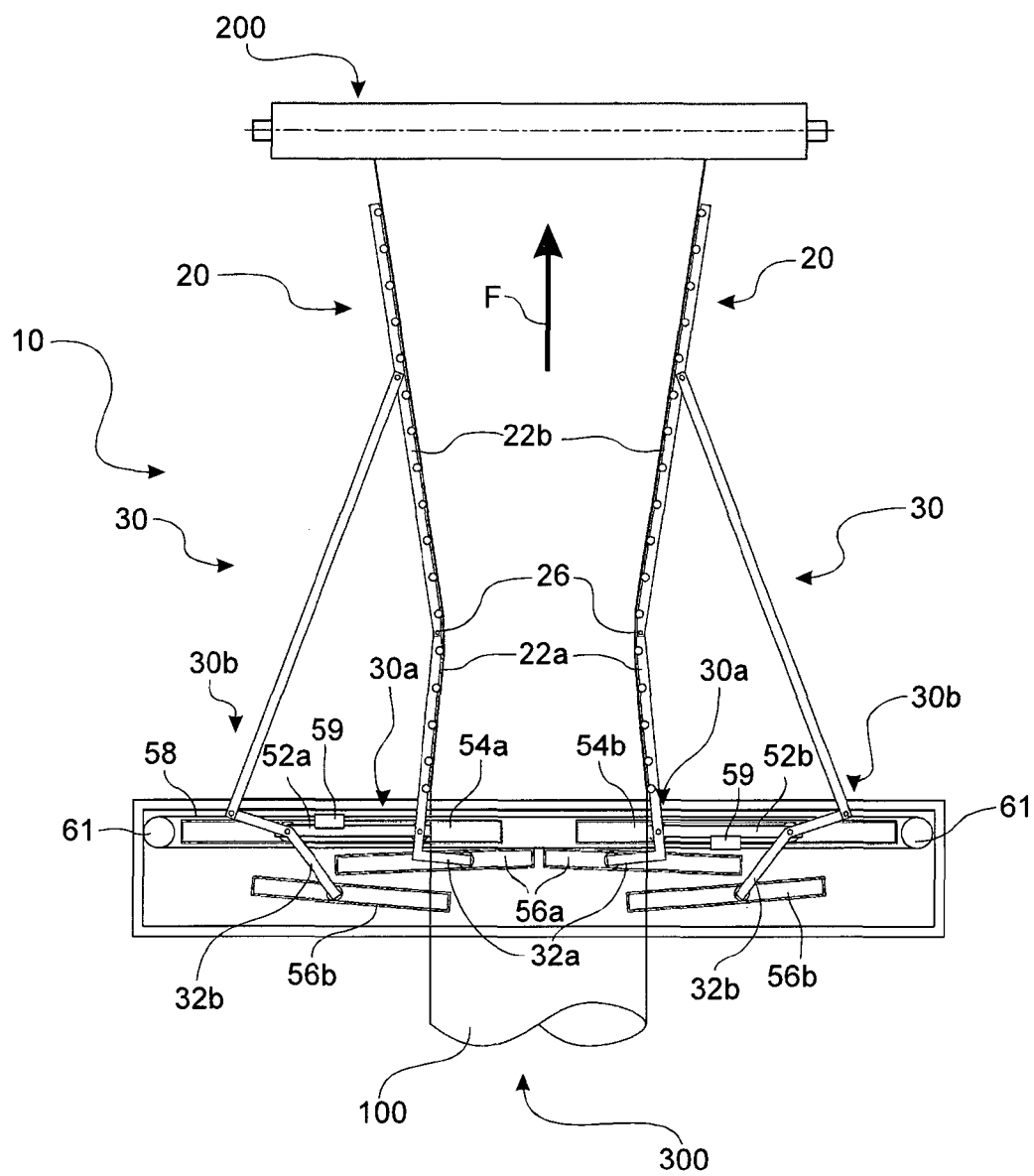
Figure 3:
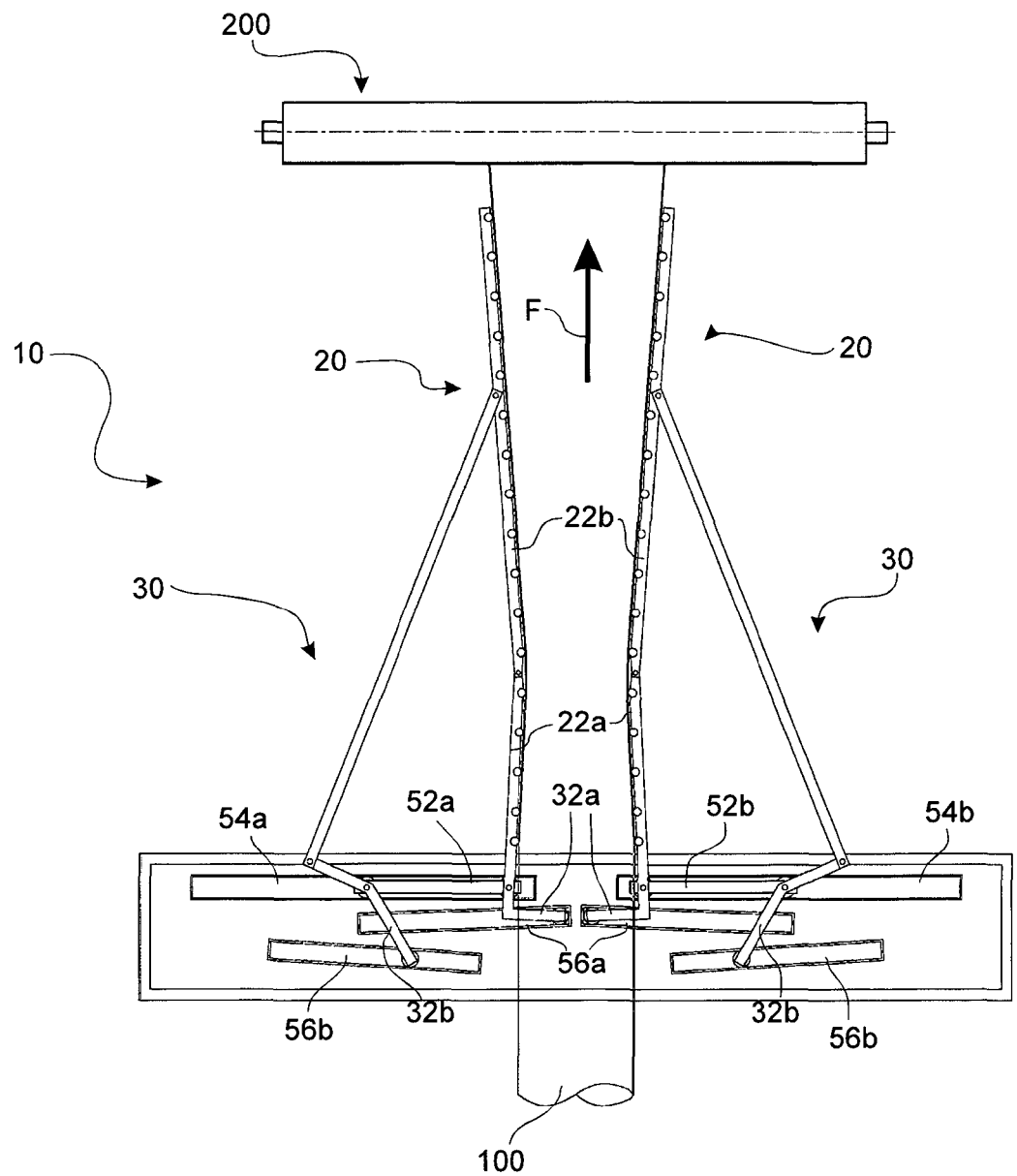

In all three FIGS. 1 to 3 a diverse adjustment of the particular lever kinematics 30 and accompanied a corresponding diverse formation of the angles of attack $\alpha_k$, $\alpha_e$, $\alpha_a$ is shown. As further learned from the three figures, the cross section of the respective blown film 100 differs. Particularly a correlation exists between the cross section of the blown film 100, which is pretended by the release cross section of the film blowing head 300 (not shown), and the adjusted or required angles of attack $\alpha_k$, $\alpha_e$, $\alpha_a$.

By means of FIG. 1 the operating mode of the present invention should be described in detail. In this embodiment a blown film 100 is produced by a not shown film blowing head 300. This comprises a mainly round diameter. The blown film 100 is moved alongside the conveyance direction F towards a take-off roller device 200. The take-off roller device comprises at least two take-off roller which counter-rotate towards one another and convey the lodged double layer of the blown film 100. For the distance between the film blowing head 300 and the take-off roller device 200 the guidance device 10 according to the invention is intended.

For a variation of the angles of attack $\alpha_k$, $\alpha_e$, $\alpha_a$ of the guidance device 10 according to the invention a respective lateral guidance 20 on the left and on the right side of the blown film is intended. Both lateral guidances 20 are opposing and mainly identical, which means formed with a common adjustability of the drive device 50. According to this, at present only the adjustment of one of both lateral guidances 20 is described, wherein this description operates also for the other lateral device 20 in the same way Each lateral device 20 comprises two guidance segments 22a and 22b. These guidance segments 22a and 22b are each shaped in a frame-like way and comprise guidance rollers 24, which ensure a lateral guidance of the blown film 100 in a minimal friction manner. At first the blown film 100 is restricted regarding the diameter transverse towards the conveyance direction F and subsequently expanded during the level process towards the take-off roller device 200. Thereby a first feeding angle $\alpha_e$, an articulation with an articulation angle $\alpha_k$ and a discharge angle $\alpha_a$ result towards the take-off roller device 200.

In order to adjust the previously described angles, a drive device 50 is intended. This comprises according to this embodiment a motor 51 in form of a linear drive 51. This linear drive 51 of the drive device 50 accesses to the slide 52a, which is translatory movably mounted in a rail 54a. With other words, the slide 52a can be automatically adjusted in a rail 54a rightwards and leftwards via a motor 51.

At the slide 52a a guiding to the lever kinematics 30 is intended at two positions. On the left edge a guidance to the second kinematics portion 30b and at the right edge of the slide 52a a guidance to the first kinematics portion 30a is intended. Each of both kinematics portions 30a, 30b comprises each a guidance lever 32a and 32b. Further, both of these kinematics portions 30a and 30b comprise a section lever 34a and 34b, by which an operative connection or a linkage respectively to the respective guidance segment 22a and 22b is intended. Both guidance segments 22a and 22b are jointly connected with one another via a joint 26.

If the slide 52 is rightwardly moved in its rail 54a via the motor 51, an automatically drive of both kinematics portions 30a and 30b via the respective junction at the slide 52a occurs. Thereby the respective guidance lever 32a and 32b is automatically moved rightwards. By the rightward movement of the guidance levers 32a and 32b the edges of the guidance levers 32a and 32b follow each a guidance rail 56a and 56b via a wheel bearing assembly. Thereby the first guidance lever 32a moves upwards in the first guidance rail 56a while the second guidance lever 32b follows downwards. Both guidance rails 56a and 56b are not perpendicularly towards the conveyance direction F, but comprise contrary or aligned pointed angles of attack in different directions towards the conveyance direction F.

By the movement described in the subsequent paragraph of both guidance levers 32a and 32b a tilting movement is brought to each of both kinematics portions 30a and 30b. This tilting movement or lever movement is transferred to the particular guidance segment 22a and 22b via the respective kinematics portion 30a and 30b of the lever kinematics, particularly via the respective section lever 34a and 34b. The transfer occurs in a higher or lower engagement of both guidance segments 22a.

Basically this adjustment is shown in FIGS. 2 and 3, although there are shown slide variations of the guidance device 10 according to the invention. Therefore, by a rightward movement of the slide 52a a decrease of the diameter of the blown film 100 or an adjustment to a smaller diameter of the blown film 100 is respectively rendered. At the same time the feeding angle $\alpha_e$ and the output angle $\alpha_a$ as well as the articulation angle $\alpha_k$ is diminished. At the limit stop according to FIG. 3 a minimum formation of all angles of attack $\alpha_e$ and $\alpha_a$ of both guidance segments 22a and 22b is recognized. At the same time a minimum diameter of the blown film is achieved. Naturally a removement in the opposing direction is possible in order to provide with a maximum diameter of the blown film 100 a maximum feeding angle $\alpha_e$ and a maximum output angle $\alpha_a$.

All embodiments according to FIGS. 1 to 3 have in common, that both lateral guidances 20 are shaped in an identical manner. In order to enable that a single motor 51 can vary all guidance segments 22a and 22b according to both lateral guidances 20 concerning the angles of attack $\alpha_e$ and $\alpha_a$ according to the invention, regarding FIG. 2 a chain device 58 is intended. It is particularly formed as a tape, preferably made of plastic and proceeds at the left and right edge of a corresponding frame 60 about deflector rolls 61. Via brackets 59 or bracket devices, a translatory connection between the first slide 52a, as it is described regarding FIG. 1 and a second slide 52b occurs. The connection via the brackets 59 occurs once at the upper and the other time at the lower edge of the slide 52a or 52b, so that during the circulation of the chain device 58 a reversion of the movement direction of both slides towards another occurs. If the left slide 52a is moved rightwards via the motor 51 a movement of the second slide 52b occurs to the left via the connection of both brackets 59 and the cooperation with the chain device 58. Both slides 52a and 52b are either moving towards one another or away from one another. Via deflector rolls 61 a corresponding drive shaft is able to drive an identical formation also on the opposing side above the drawing layer of FIG. 2, as shown in FIG. 2. This leads to a duplication of the entire mechanical parts, so that a bilateral mounting of both lateral devices 20 and both lever kinematics 30 as well as a bilateral influence to the respective kinematics portions 30a and 30b occurs. Also with this embodiment a variation occurs in a manner which is described in detail regarding FIG. 1.

The subsequent descriptions of the embodiment are describing the present invention exclusively in examples. Naturally individual features of the embodiments, as long as they are technically meaningful can be freely combined without leaving the scale of the present invention.

| | References |
|---|---|
| 10 | Guidance device |
| 20 | Lateral guidance |
| 22a | First guidance segment |
| 22b | Second guidance segment |
| 24 | Guidance roller |
| 26 | Joint |
| 30 | Lever kinematics |
| 30a | First kinematics portion |
| 30b | Second kinematics portion |
| 32a | First guidance lever |
| 32b | Second guidance lever |
| 34a | First section lever |
| 34b | Second section lever |
| 50 | Drive device |
| 51 | Motor |
| 52a, 52b | Slide |
| 54a, 54b | Rail |
| 56a | First guidance rail |
| 56b | Second guidance rail |
| 58 | Chain device |
| 59 | Bracket |
| 60 | Frame |
| 61 | Deflector roll |
| $\alpha_k$ | Angle of attack |
| $\alpha_e$ | Angle of attack |
| $\alpha_a$ | Angle of attack |
| 100 | Blown film |
| 200 | Take-off roller device |
| 300 | Film blowing head |
| F | Conveyance direction |

What is claimed is:

1. Guidance device for guiding a blown film between a film blowing head and a take-off roller device, comprising at least two opposing lateral guidances for the lateral guidance of the blown film characterized in that, at least one lateral guidance comprises a first guidance segment and a second guidance segment, jointly connected to each other, wherein at least one lever kinematics is intended, which comprises a plurality of at least two levers and is in actuation connection with a single common drive device and with both guidance segments in a way, that during actuation the drive device angles of attack ($\alpha_a$, $\alpha_e$) of both guidance segments are variable via the lever kinematics towards the conveyance direction (F) of the blown film;

wherein $\alpha_a$ is a feeding angle between the first guidance segment and the film blowing head, and $\alpha_e$ is a gradient angle between the second guidance segment and the conveyance direction.

2. Guidance device according to claim 1, characterized in that the drive device comprises at least one slide which is translatory movably mounted and with which the lever kinematics is in gear connection at at least one position.

3. Guidance device according to claim 1, characterized in that at least a guidance rail is intended, in which at least one guidance lever of the lever kinematics is translatory movably mounted.

4. Guidance device according to claim 3, characterized in that the guidance rail forms an angle smaller than 90° with the conveyance direction (F) of the blown film.

5. Guidance device according to claim 3, characterized in that at least one first guidance rail and at least one second guidance rail is intended, wherein in at least one first guidance rail a first guidance lever of the lever kinematics and in at least a second guidance rail a second guidance lever of the lever kinematics is translatory movably mounted.

6. Guidance device according to claim 1, characterized in that the lever kinematics comprises a first section lever for the connection with the first guidance segment and a second lever for the connection with a second guidance segment.

7. Guidance device according to claim 1, characterized in that the lever kinematics comprises at least a first kinematics portion, which is connected to the first guidance segment via the first section lever and at least a second kinematics portion, which is connected to the second guidance segment.

8. Guidance device according to claim 7, characterized in that at least one of the two kinematics portions is in drive connection with the drive device.

9. Guidance device according to claim 1, characterized in that the drive device comprises at least one revolving chain device, via which the drive device is in drive connection with at least one further lever kinematics.

10. Guidance device according to claim 9, characterized in that the chain guidance is connected with at least one slide via at least one bracket, the chain device is translatory movably mounted alongside a rail and with which the lever kinematics is in drive connection at at least one position.

11. Guidance device according to claim 1, characterized in that at least a frame is intended, in which the drive device and/or the lever kinematics and/or the lateral guidance is mounted.

12. Guidance device according to claim 1, characterized in that the drive device comprises at least one electric motor.

13. Guidance device according to claim 1, characterized in that both lateral guidances are identically formed and both comprise a lever kinematics which are in drive connection with the same drive device.

14. Guidance device according to claim 4, characterized in that at least one first guidance rail and at least one second guidance rail is intended, wherein in at least one first guidance rail a first guidance lever of the lever kinematics and in at least a second guidance rail a second guidance lever of the lever kinematics is translatory movably mounted.

15. Guidance device according to claim 7,
characterized in that the at least a second kinematics portion is connected to the second guidance segment via the second section lever.

16. Guidance device according to claim 8,
characterized in that at least one of the two kinematics portions is in drive connection with the drive device, via at least one of the first guidance lever and the second guidance lever.

17. Method for adjusting the angles of attack ($\alpha_a$, $\alpha_e$) of guidance segments of opposing lateral guidances of a guidance device, for guidance of a blown film between a blown film head and a take-off roller device characterized in that angles of attack ($\alpha_a$, $\alpha_e$) of at least two guidance segments are varied in conjunction by the drive of a common drive device via a drive connection with at least a lever kinematics, which comprises a plurality of at least two levers;
wherein the lever kinematics is connected to the guidance segments in a way that during the drive of the drive device the angles of attack of both guidance segments are variable towards the conveyance direction of the blown film via the lever kinematics; and
wherein $\alpha_a$ is a feeding angle between the first guidance segment and the film blowing head, and $\alpha_e$ is a gradient angle between the second guidance segment and the conveyance direction.

18. Method according to claim 17, characterized in that the guidance device comprises at least two opposing lateral guidances for the lateral guidance of the blown film characterized in that, at least one lateral guidance comprises a first guidance segment and a second guidance segment, jointly connected to each other, wherein at least one lever kinematics is intended, which comprises a plurality of at least two levers and is in actuation connection with a single common drive device and with both guidance segments in a way, that during actuation the drive device the angles of attack ($\alpha_a$, $\alpha_e$) of both guidance segments are variable via the lever kinematics towards the conveyance direction (F) of the blown film.

* * * * *